US011777604B2

(12) United States Patent
Schwartz et al.

(10) Patent No.: US 11,777,604 B2
(45) Date of Patent: Oct. 3, 2023

(54) GATE-BASED OPTICAL DATA TRANSMISSION

(71) Applicant: PRODUCT DEVELOPMENT TECHNOLOGIES, INC., Lake Zurich, IL (US)

(72) Inventors: Mark W. Schwartz, Wauconda, IL (US); George J. Guffey, Volo, IL (US); Michael Kuehn, Rolling Meadows, IL (US)

(73) Assignee: PRODUCT DEVELOPMENT TECHNOLOGIES, INC., Lake Zurich, IL (US)

( * ) Notice: Subject to any disclaimer, the term of this patent is extended or adjusted under 35 U.S.C. 154(b) by 346 days.

(21) Appl. No.: 17/101,894

(22) Filed: Nov. 23, 2020

(65) Prior Publication Data

US 2021/0105070 A1    Apr. 8, 2021

Related U.S. Application Data

(63) Continuation-in-part of application No. 16/749,410, filed on Jan. 22, 2020.

(60) Provisional application No. 62/938,441, filed on Nov. 21, 2019, provisional application No. 62/795,365, filed on Jan. 22, 2019.

(51) Int. Cl.
| | |
|---|---|
| *H04B 10/11* | (2013.01) |
| *H04B 10/116* | (2013.01) |
| *H04B 10/40* | (2013.01) |
| *H04W 4/38* | (2018.01) |
| *H04B 10/112* | (2013.01) |
| *H04N 21/214* | (2011.01) |
| *G06F 8/60* | (2018.01) |
| *B64D 11/00* | (2006.01) |
| *H04B 7/185* | (2006.01) |

(52) U.S. Cl.
CPC ........... *H04B 10/116* (2013.01); *H04B 10/40* (2013.01); *H04W 4/38* (2018.02); *B64D 11/0015* (2013.01); *G06F 8/60* (2013.01); *H04B 7/18506* (2013.01); *H04B 10/11* (2013.01); *H04B 10/112* (2013.01); *H04N 21/214* (2013.01)

(58) Field of Classification Search
CPC .. H04B 10/116; H04B 10/40; H04B 7/18506; H04B 10/11; H04B 10/112; H04W 4/38; H04W 4/44; B64D 11/0015; G06F 8/60; H04N 21/214
USPC .................. 398/118–131, 135–172, 182–214
See application file for complete search history.

(56) References Cited

U.S. PATENT DOCUMENTS

| | | |
|---|---|---|
| 6,392,692 B1 | 5/2002 | Monroe |
| 6,741,841 B1 | 5/2004 | Mitchell |

(Continued)

FOREIGN PATENT DOCUMENTS

EP    2 393 225 A1    12/2011

*Primary Examiner* — Dibson J Sanchez
(74) *Attorney, Agent, or Firm* — Pauley Erickson & Swanson

(57) ABSTRACT

A system and method for updating and maintaining an onboard entertainment server on an aircraft includes a gate LiFi access point positioned in a gate area of an airport, the gate LiFi access point having a removable server. An aircraft LiFi receiver is positioned in the aircraft, the aircraft LiFi receiver and the removable server capable of line-of-sight transmission of updated data and a content loader receives the updated data in the onboard entertainment server.

8 Claims, 5 Drawing Sheets

(56) References Cited

U.S. PATENT DOCUMENTS

| | | | |
|---|---|---|---|
| 9,049,676 B2 | 6/2015 | Haas et al. | |
| 9,584,618 B1 | 2/2017 | Mitchell | |
| 10,693,557 B1* | 6/2020 | Ayotte | H04B 10/116 |
| 10,727,941 B1* | 7/2020 | Kanagarajan | H04B 10/1127 |
| 2002/0131123 A1 | 9/2002 | Clark | |
| 2002/0160773 A1* | 10/2002 | Gresham | B64D 11/0015 |
| | | | 455/431 |
| 2003/0130769 A1* | 7/2003 | Farley | H04B 7/18506 |
| | | | 701/3 |
| 2007/0027589 A1* | 2/2007 | Brinkley | G08G 5/0013 |
| | | | 701/3 |
| 2008/0064332 A1 | 3/2008 | Lee et al. | |
| 2008/0195259 A1 | 8/2008 | Davis et al. | |
| 2010/0023602 A1* | 1/2010 | Martone | G06F 8/60 |
| | | | 709/220 |
| 2010/0142966 A1 | 6/2010 | Erdos et al. | |
| 2011/0069958 A1 | 3/2011 | Haas et al. | |
| 2011/0302616 A1* | 12/2011 | Mizukami | H04B 10/116 |
| | | | 725/76 |
| 2012/0003922 A1 | 1/2012 | Buga et al. | |
| 2012/0232791 A1* | 9/2012 | Sterkel | H04H 20/62 |
| | | | 701/454 |
| 2013/0126713 A1 | 5/2013 | Haas et al. | |
| 2013/0182912 A1* | 7/2013 | Mak | B64F 1/368 |
| | | | 235/462.01 |
| 2013/0321169 A1 | 12/2013 | Bateman et al. | |
| 2014/0011441 A1* | 1/2014 | Lauer | H04H 20/71 |
| | | | 455/3.06 |
| 2014/0074521 A1* | 3/2014 | Morioka | G06Q 10/02 |
| | | | 705/5 |
| 2014/0136658 A1* | 5/2014 | Wahler | H04B 7/18506 |
| | | | 709/218 |
| 2014/0226983 A1 | 8/2014 | Vargas | |
| 2014/0254693 A1 | 9/2014 | Mitchell et al. | |
| 2015/0150061 A1* | 5/2015 | Bleacher | H04N 21/4436 |
| | | | 725/76 |
| 2015/0206439 A1 | 7/2015 | Marsden et al. | |
| 2015/0215040 A1* | 7/2015 | Dickson | H04B 10/1125 |
| | | | 398/131 |
| 2015/0222350 A1 | 8/2015 | Shi | |
| 2015/0341113 A1* | 11/2015 | Krug | H04B 10/116 |
| | | | 398/118 |
| 2015/0349882 A1 | 12/2015 | Lamkin et al. | |
| 2016/0112071 A1 | 4/2016 | Shelton et al. | |
| 2016/0205724 A1 | 7/2016 | Shi | |
| 2016/0344792 A1* | 11/2016 | Sinivaara | H04N 21/25841 |
| 2016/0352412 A1* | 12/2016 | Di Costanzo | H04N 21/2146 |
| 2017/0026676 A1* | 1/2017 | Watson | H04H 20/62 |
| 2017/0233098 A1 | 8/2017 | Gerard | |
| 2018/0020042 A1 | 1/2018 | Couleaud et al. | |
| 2018/0027036 A1* | 1/2018 | Watson | H04W 84/12 |
| | | | 709/219 |
| 2018/0027037 A1* | 1/2018 | Watson | H04L 67/568 |
| | | | 709/219 |
| 2018/0037336 A1 | 2/2018 | Rammos | |
| 2018/0343570 A1 | 11/2018 | Misenheimer et al. | |
| 2019/0349071 A1* | 11/2019 | Saxena | H04B 7/18506 |
| 2020/0068358 A1* | 2/2020 | Macrae | H04N 21/239 |
| 2020/0195342 A1 | 6/2020 | Rapaport et al. | |
| 2020/0266892 A1 | 8/2020 | Schwartz et al. | |
| 2021/0021528 A1* | 1/2021 | Newman | H04L 47/58 |

* cited by examiner

GATE-BASED OPTICAL DATA TRANSMISSION

CROSS-REFERENCE TO RELATED APPLICATION

This application is a continuation-in-part of U.S. patent application Ser. No. 14/749,410, filed on 22 Jan. 2020 which claimed the benefit of Provisional U.S. Patent Application Ser. Nos. 62/795,365, filed on 22 Jan. 2019 and 62/938,441, filed 21 Nov. 2019.

This application also claims the benefit of U.S. Provisional Patent Application Ser. No. 62/949,955, filed on 18 Dec. 2019. The co-pending Parent and Provisional Patent Applications are hereby incorporated by reference herein in its entirety and is made a part hereof, including but not limited to those portions which specifically appear hereinafter.

FIELD OF THE INVENTION

The present invention relates to a system for updating and maintaining an onboard data and/or entertainment server of an aircraft.

BACKGROUND OF THE INVENTION

Modern commercial airliners include onboard data servers that house a variety of information. Included are in-flight entertainment ("IFE") systems that distribute selectable entertainment options to individual passenger seats from an onboard server. The onboard server typically communicates with one or more wireless access portals (WAP) distributed throughout the aircraft which subsequently provide signals to individual passenger service units (PSU) that are located at or in the vicinity of each respective passenger seat.

Existing systems require extensive wiring and are cumbersome to update. Conventional systems require satellite updates to the onboard server or require an onboard media loader which must be updated by hand by flight crew or service staff using portable hard drives. As a result, airlines tend to minimize the frequency of updates thus resulting in stale onboard content and a lack of customizable options.

As such, a need exists for a system that permits updating of the onboard server as quickly as every turn of the aircraft. Such a system should be fast, secure and reliable. Optimally, such a system does not require physical intervention by the airline flight crew or support staff.

Accordingly, wireless communication fidelity using visible light ("Light Fidelity" or "LiFi") technology may be used for wireless transmission using visible light spectrum for data transmission. LiFi is high speed, bidirectional, and fully networked wireless communication of data using light. LiFi typically comprises multiple lightbulbs that form a wireless network. When an electrical current is applied to a light emitting diode (LED) light bulb a stream of light is emitted from the LED. LEDs are semiconductor devices, which means that the brightness of the light flowing through them can be changed at extremely high speeds. This allows sending a signal by modulating the light at different rates. The signal can then be received by a detector which interprets the changes in light intensity (the signal) as data. The intensity modulation cannot be seen by the human eye, and thus communication is just as seamless as other radio systems, allowing the users to be connected where there is LiFi enabled light. Using this technique, data can be transmitted from an LED and back at high speeds.

LiFi technology is available using light sources such as LEDs to form WAP hotspots to enable network access. LiFi techniques, such as those described in Haas et al., U.S. Publication 2011/0069958, incorporated herein by reference and Haas et al., U.S. Publication 2013/0126713, incorporated herein by reference, and Haas et al., U.S. Pat. No. 9,049,676, incorporated herein by reference, enable wireless communication using visible light, that is, a controlled signal using high-speed blinking light to transmit information. Such systems have been proposed to transmit data to PSUs in an aircraft, such as Vargas, U.S. Publication 2014/0226983 and Mizukami, EP 2 393 225.

SUMMARY OF THE INVENTION

The invention details a system for updating and maintaining an onboard server, specifically, for example, an entertainment server, and includes LiFi access points on an aircraft and a gate area for transferring data updates to an onboard server.

The system preferably includes a gate LiFi access point positioned in a gate area of an airport and an aircraft LiFi receiver positioned on an aircraft. The LiFi access points preferably include both a detector and an optical transmitter (light source).

The gate LiFi access point and the aircraft LiFi receiver are preferably capable of line-of-sight transmission such that the LiFi signals may be exchanged in a galley area of the aircraft by a member of the flight crew, gate staff and/or maintenance crew.

Other objects and advantages will be apparent to those skilled in the art from the following detailed description taken in conjunction with the appended claims and drawings.

DETAILED DESCRIPTION OF THE INVENTION

The present invention provides a system and method for updating an onboard data server, for instance, an entertainment system of a vehicle, preferably an aircraft. Although the invention is primarily directed to airports, aircraft and the commercial airline industry, the present invention may have applicability across a range of commercial vehicles and transportation options including buses, boats, ferries, trains, and other commercial vehicles that may potentially accommodate onboard servers and changing server content.

In addition, although an onboard entertainment server is used in one embodiment of the subject invention, an onboard data server that includes one or more of maintenance systems, crew systems, avionics and/or other data may be used in accordance with the subject system.

Figure 1:
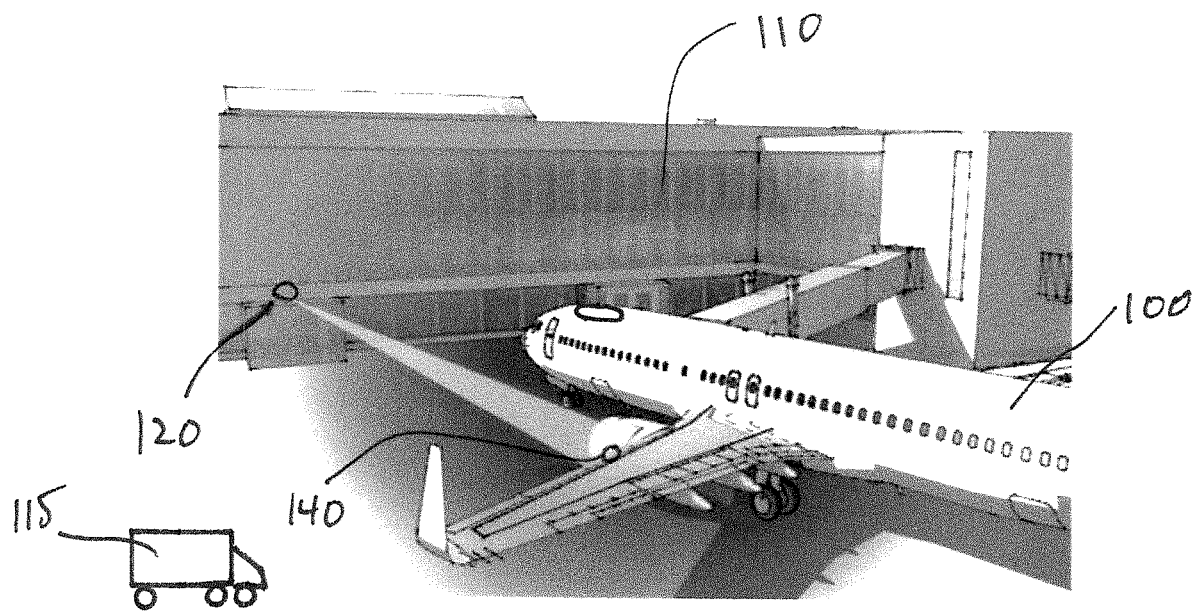
FIG. 1 is a schematic of a system according to one embodiment of this invention.
Figure 2:
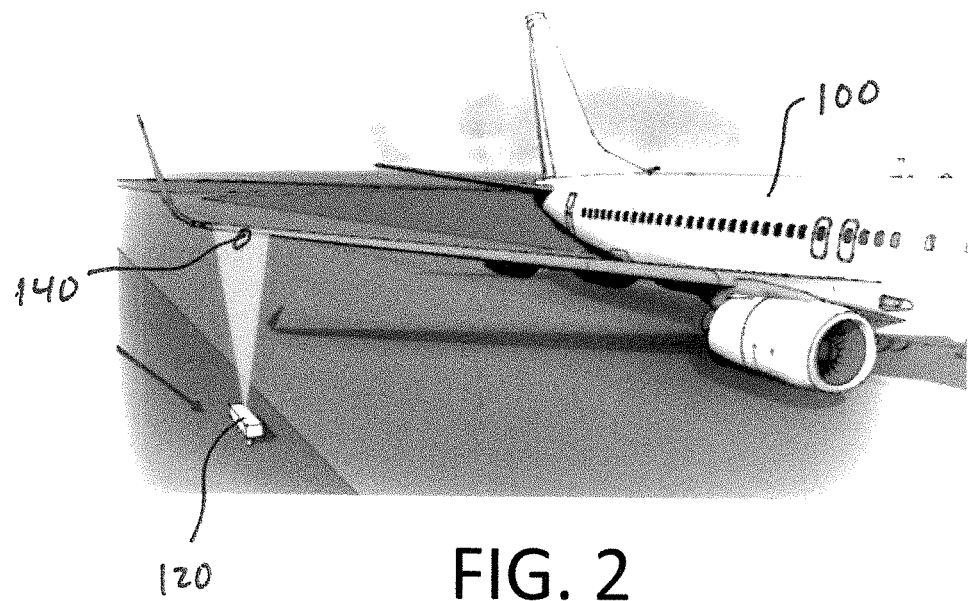
FIG. 2 is a schematic of a system according to one embodiment of this invention.
Figure 4:
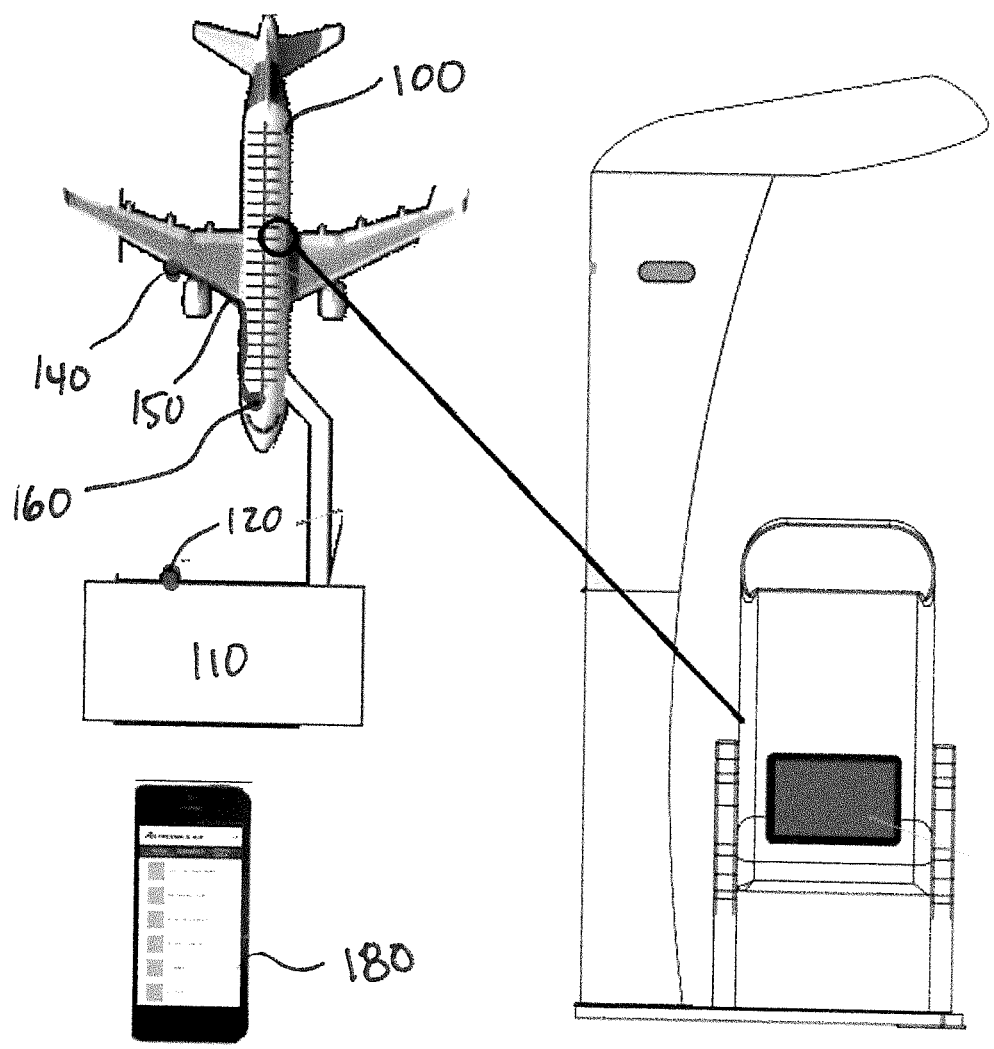
FIG. 4 is a schematic of a system according to one embodiment of this invention.

As such, FIGS. 1, 2 and 4 show schematics of a system for updating and maintaining an onboard entertainment server on an aircraft preferably includes a gate LiFi access point 120 positioned in a gate area 110 of an airport and an aircraft LiFi access point 140 positioned on an aircraft 100.

As used herein, and as shown in one representation at FIG. 2, a LiFi access point 120, 140 preferably includes both a detector 125 and an optical transmitter 130 (light source). The detector 125 is preferably capable of accepting signals from an optical transmitter 130 in a corresponding LiFi access point 140, 120. The optical transmitter 130 preferably comprises one or more LED bulbs. The detector 125 preferably converts the light-intensity variations of the optical transmitter 130 into an electric signal, which is then converted back into a data stream that is transferred to an onboard entertainment server 160.

The gate LiFi access point 120 and the aircraft LiFi access point 140 are preferably capable of line-of-sight transmission such that the LiFi signals may be exchanged between the gate 110 and the aircraft 100. Accordingly, one preferred objective of the subject invention is to send and receive updated data between the aircraft 100 and the gate 110 with increased frequency, preferably as much as every turn of the aircraft 100.

A transmission link 150 is preferably positioned between the aircraft LiFi access point 140 and the onboard entertainment server 160 to transfer updated data to the onboard entertainment server 160. The transmission link 150 may comprise an optical cable, a standard cable, a Wifi link or any other suitable manner of transmitting updated date from the aircraft LiRi access point 140 to the onboard entertainment server 160.

Figure 5:
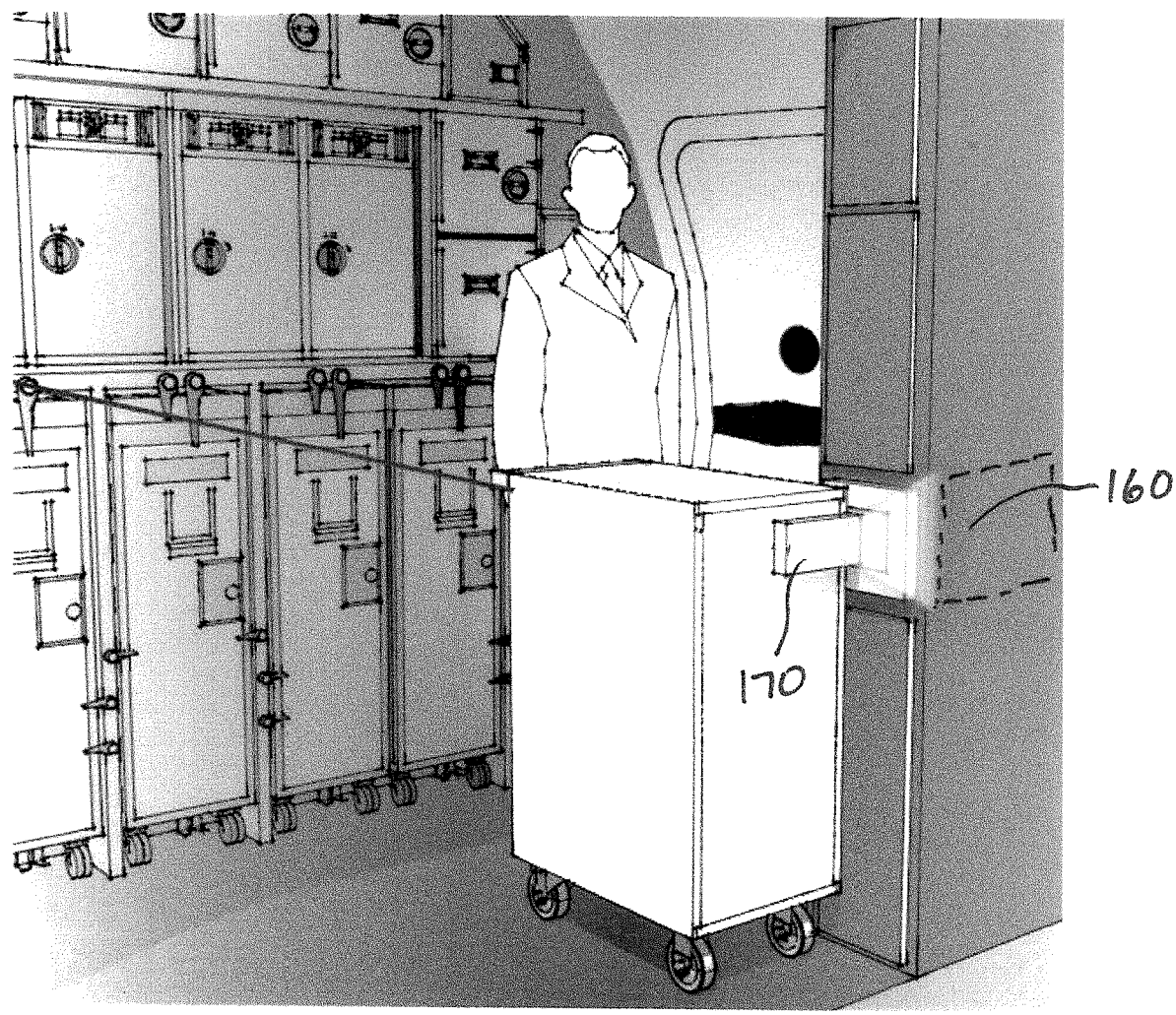
FIG. 5 is a schematic of a system according to one embodiment of this invention.

Alternatively, and as shown in FIG. 5, the transmission link may comprise a mobile LiFi link adapted for use by the flight crew. Specifically, the updated data may be transmitted to a wireless uploader 170 that may be placed into proximity to the onboard entertainment server 160 where transfer may take place. Using existing technology, such updates are typically achieved using portable High Density USB drives and/or removable hard drives. However, according to this embodiment, such transfer and update may take place using LiFi technology from the mobile LiFi link to the onboard entertainment server 160. The mobile LiFi link may be positioned on an existing galley cart or a service cart or some other mobile aircraft supply unit.

According to a preferred embodiment of the invention, the aircraft LiFi access point 140, and specifically the optical transmitter, may be adapted to utilize an existing component of the aircraft. Specifically, the optical transmitter and the associated LEDs may comprise a wingtip, nose tip and/or fuselage light of the aircraft. Alternatively, or in addition, the optical transmitter 130 of the aircraft LiFi access point 140 may be positioned on or within a radome of the aircraft 100.

Figure 3:
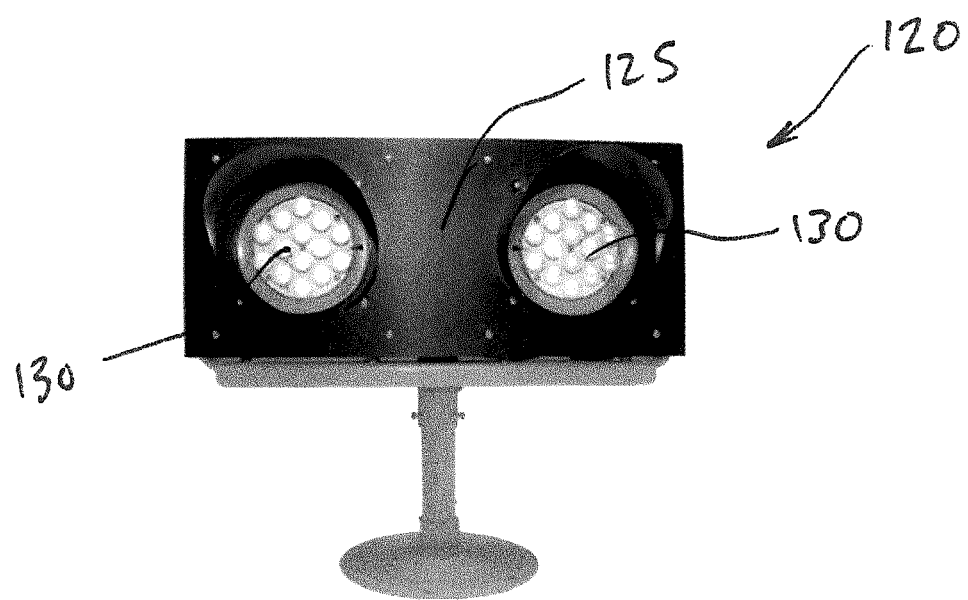
FIG. 3 is a front view of a LiFi access point according to one embodiment of this invention.

As shown in FIG. 3, the optical transmitter 130 may comprise one or more light emitting diodes. In this embodiment, the gate LiFi access point 120 may be fixedly mounted to a physical area of the gate 110, as shown in FIG. 1. Alternatively, or in addition, the gate LiFi access point 120 may be positioned on the tarmac in an existing runway light or in a standalone fixed and/or portable gate LiFi access point 120, such as shown in FIG. 2. Alternatively, or in addition, the gate LiFi access point 120 may be fixed to a piece of moveable equipment, such as an aircraft service vehicle 115, as shown in FIG. 1, such as a luggage vehicle, a food service vehicle, an aircraft service vehicle and/or any other suitable portable service equipment.

As shown in FIG. 3, a plurality of LEDs may comprise the optical transmitter 130 of the LiFi access points 120, 140. These LEDs may be arranged such that a portion are designated for communicating and updating entertainment data but another portion may be designated for communicating and updating maintenance data, crew data, avionics and/or other suitable data. In this manner, the LiFi access point 120 shown in FIG. 3 may include an optical transmitter 130 on the left side for entertainment data and an optical transmitter 130 on the right side for other suitable data. Alternatively, specific LEDs within a cluster may be designated for individual data sets such that an optical transmitter 130 includes multiple LEDs that are each transmitting different data sets. Likewise, the receivers 125 may be similarly parsed to receive such individual data sets.

An associated method with the described system for updating and maintaining an onboard entertainment server on an aircraft preferably includes positioning a gate LiFi access point 120 in a gate area of an airport and positioning an aircraft LiFi access point 140 on an exterior surface of the aircraft 100. The gate LiFi access point 120 and the aircraft LiFi access point 140 are preferably capable of line-of-sight transmission of updated data. Updated data is then sent a transmission link between the aircraft LiFi access point 140 and the onboard entertainment server 160.

The updated data described herein may be updated using standard entertainment programming options from the airlines. In addition, or alternatively, a customized menu of updated data may be developed by passengers on the aircraft. The system preferably includes updated data that may be selected by a passenger on the aircraft. Such selections may be made on an airline application using a personal device, such as a smartphone or internet portal.

In this regard, a passenger may open an airline application and input one or more selections regarding preferred content on the onboard entertainment server 160. The inputs may be made onboard or prior to boarding. Such selection may include specific content or topics to view on the plane including movies, DVR-like content, TV series, news, sporting events, music, games, educational/how-to, and other suitable content. In addition, or alternatively, the passenger may pre-order food/drinks from the plane or meals from restaurants in the airport.

Following passenger input, the selection may be included in the updated data transferred to the onboard server 160 and the updated data may be sent directly to a seat of the passenger, as shown in FIG. 4. As a result, preferably up to every turn of the aircraft, when updated data is transmitted to the onboard server 160, the update may include: what content the user has completed; resume timestamps; begin the data purge process; and/or other real-time updates to the content of the user selected data. The system can then send pre-selected content, continue points and new DVR content for the next flight.

As described herein, the subject system for updating and maintaining an onboard server may be used in any suitable commercial passenger vehicle. In this regard, the gate LiFi access point may be positioned in a loading area of a vehicle depot. The vehicle LiFi access point may be positioned on an exterior surface of the vehicle. The transmission link between the vehicle LiFi access point and the onboard server thereby transfers updated data to the onboard server.

There are also advantages in the present invention of speed of transmission. Conventional WiFi at 802.11ac provides 1 Gbps of data while 802.1 lad provides around 7 Gbps. As described herein, LiFi may provide around 11 Gbps of data.

Another advantage of the present invention is security. Line of sight transmission prevents unauthorized Wifi access. However, LiFi is not purely line-of-sight as light bounces off of surfaces. LiFi is a cellular communication system and the data rate is not dependent on the line of sight but on the signal quality at the device. Signal quality can be defined by the ratio of the desired data vs any interfering data and noise. LiFi is significantly more secure than other wireless technologies because light can be contained in a physical space. Doors, blinds, baffles and similar barriers can be shut, and physical barriers and adjustments can be implemented to contain and protect the light. Conditions can be created that permitting closing off wireless data. It should be understood that the existing security protocols for encryption and authentication can be leveraged in LiFi systems to provide even more secure wireless systems. Further, unlike conventional Wifi data distribution, LiFi provides no interference with critical instrumentation.

In addition, the subject system is adaptable. The signals generated by the LiFi access points are bidirectional and full duplex. Further such signals work in a wide spectrum of illumination, preferably within a band of 10-90% light illumination. LiFi can operate in daylight and even in direct sunlight conditions, as the modulated light can still be detected. LiFi relies on detecting the fast changes in light intensity and not on the absolute or slowly varying levels caused by natural disruptions in daylight or sunlight. LiFi technology modulates the light at very high rates and sunlight is constant light and therefore can be filtered out at the receiver.

According to one preferred embodiment, the subject system may be adapted for aircraft to aircraft communication in a gate area, in flight or in an area of the airport where planes are serviced and/or stored. In addition, such system may be adapted to use between military aircraft for use in theaters of war and/or threats.

Figure 6:
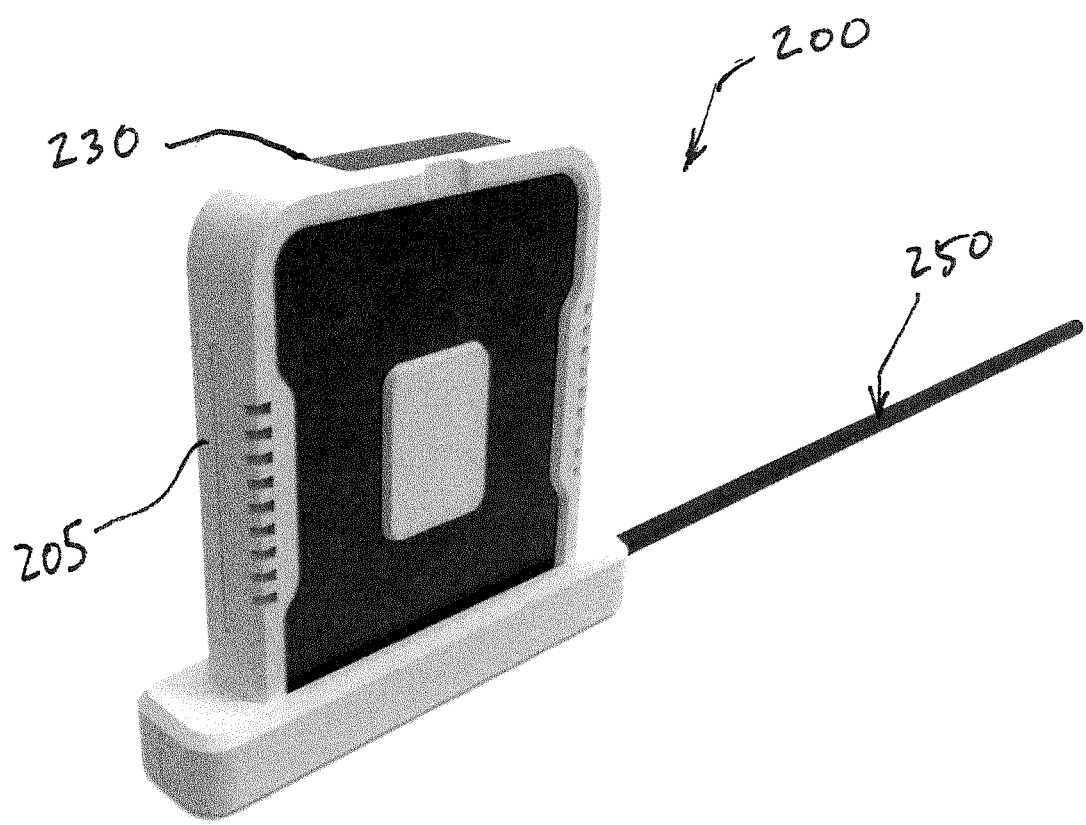
FIG. 6 is a schematic of a system according to one embodiment of this invention.
Figure 7:
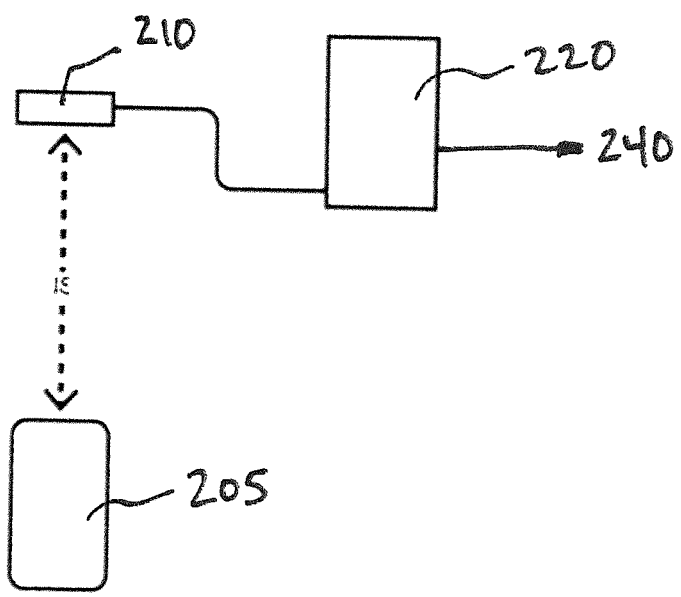
FIG. 7 is a schematic of a system according to one embodiment of this invention.

FIGS. 6 and 7 show additional embodiments of the subject invention wherein LiFi is used to download content to or from a portable drive either locally or to or from an aircraft.

As shown in FIGS. 6 and 7, a system for updating and maintaining an onboard entertainment server on an aircraft in this manner preferably includes a gate LiFi access point 200, such as shown in FIG. 6, that is preferably positioned in a gate area of an airport. The gate LiFi access point 200 may be integrated with a ticket reader 230 configured to scan and confirm passengers at a terminal gate. In this manner, a passenger can scan a ticket to board the airplane while at the same time indicating entertainment system preferences that are reflected in the bar code, QR code, RFID, or similar scannable technology located on or in the ticket and/or smart device of the passenger.

In addition, the gate LiFi access point 200 is preferably connected with respect to a communications link 250 such as an Internet connection and/or WiFi connection as shown. The communications link 250 preferably communicates entertainment system content that may be activated and/or loaded when the passenger scans a ticket at the ticket reader 230. In one preferred embodiment, content is maintained in the cloud and transmitted to the gate LiFi access point 200 in bulk or alternatively may be released when a passenger scans a ticket.

Such entertainment system preferences may be selected ahead of time by the passenger and may include movies, television, music, games, reading material and/or other content provided by the onboard systems of the aircraft. In aircraft with seatback entertainment systems, customized content may be delivered to the seat and in addition or otherwise may be delivered to a passenger's individual smart device, such as phone or tablet.

The gate LiFi access point 200 preferably includes a removable server 205. Following boarding of the aircraft or even at intervals during boarding, the removable server 205 may be removed from the gate LiFi access point 200 and brought into the aircraft by a member of the flight crew, the gate staff and/or the maintenance crew for uploading and/or downloading updated content and/or passenger data ultimately to the onboard entertainment server 240.

As shown schematically in FIG. 7, an aircraft LiFi receiver 210 is preferably fixed into positioned within the aircraft, preferably in communication with the onboard entertainment server 240. The removable server 205 is then placed into line-of-sight position relative to the aircraft LiFi receiver 210 by the responsible staff to provide updated data. A signal may indicate completion of the transmission of the updated data to the aircraft LiFi receiver 210. As described above, such LiFi communications do not require a staff member to physically connect two devices and securely transmits updated data without the need for a WiFi connection.

A content loader 220 positioned within the aircraft is preferably used to receive the updated data and transmit it to the onboard entertainment server 240. Content loaders 240 for a particular flight may thus be updated using LiFi capable portable drives at each turn of an aircraft. In this manner, highly personalized content may be custom loaded at each turn of the aircraft.

The updated data as described may include data selected by every passenger on the aircraft. Such data or content may be selected by the passenger on a smart device using an airline application, at home on a PC, and/or at a kiosk in the airport and/or gate area.

As such, a method for updating and maintaining an onboard entertainment server on an aircraft includes positioning the gate LiFi access point 200 in the gate area of an airport with a removable server. The gate LiFi access point 210, through a ticket reader 230, preferably scans a passenger ticket. The removable server is then removed from the gate LiFi access point 200 and positioned within a line-of-sight of the aircraft LiFi receiver 210 positioned in the aircraft. In this manner updated data is transferred and updated to the onboard entertainment server of the aircraft. This customized updated data may then be sent directly to a seat of the passenger that input at least the portion of the updated data.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A system for updating and maintaining an onboard entertainment server on an aircraft, the system comprising:
   a gate LiFi access point positioned in a gate area of an airport, the gate LiFi access point having a removable server, wherein the gate LiFi access point is integrated with a ticket reader configured to scan and confirm passengers at a terminal gate;
   an aircraft LiFi receiver positioned in the aircraft, the aircraft LiFi receiver and the removable server capable of line-of-sight transmission of updated data when the removable server is removed from the gate LiFi access point; and a content loader to receive the updated data in the onboard entertainment server.

2. The system of claim 1 wherein the gate LiFi access point includes an optical transmitter comprising one or more light emitting diodes.

3. The system of claim 1 wherein the updated data includes data selected by a passenger on the aircraft.

4. The system of claim 3 wherein the data is selected by the passenger within an airline application.

5. A method for updating and maintaining an onboard entertainment server on an aircraft, the method comprising:

positioning a gate LiFi access point in a gate area of an airport, the gate LiFi access point having a removable server;

scanning a passenger ticket using the gate LiFi access point;

updating data in the removable server;

removing the removable server from the gate LiFi access point;

positioning the removable server within a line-of-sight of an aircraft LiFi receiver positioned in the aircraft to transmit updated data; and updating the onboard entertainment server of the aircraft with the updated data.

6. The method of claim 5 further comprising permitting a passenger to select at least a portion of the updated data.

7. The method of claim 5 further comprising positioning a content loader between the aircraft LiFi receiver and the onboard entertainment server.

8. The method of claim 5 further comprising:

sending the updated data directly to a seat of the passenger that input at least the portion of the updated data.

* * * * *